US009959348B2

(12) United States Patent
Staddon et al.

(10) Patent No.: US 9,959,348 B2
(45) Date of Patent: May 1, 2018

(54) APPLYING SOCIAL ANNOTATIONS TO SEARCH RESULTS

(75) Inventors: Jessica Staddon, Redwood City, CA (US); David Andrew Huffaker, Palo Alto, CA (US); Lujun Fang, Ann Arbor, MI (US)

(73) Assignee: Google LLC, Mountain View, CA (US)

( * ) Notice: Subject to any disclaimer, the term of this patent is extended or adjusted under 35 U.S.C. 154(b) by 375 days.

(21) Appl. No.: 13/605,930

(22) Filed: Sep. 6, 2012

(65) Prior Publication Data

US 2015/0169771 A1  Jun. 18, 2015

Related U.S. Application Data

(60) Provisional application No. 61/655,443, filed on Jun. 4, 2012.

(51) Int. Cl.
*G06F 17/30* (2006.01)

(52) U.S. Cl.
CPC .............................. *G06F 17/30867* (2013.01)

(58) Field of Classification Search
None
See application file for complete search history.

(56) References Cited

U.S. PATENT DOCUMENTS

| | | | | |
|---|---|---|---|---|
| 6,745,178 B1 * | 6/2004 | Emens et al. | ................. | 707/741 |
| 8,015,177 B2 * | 9/2011 | Yacobi | ................... | G06Q 10/04 707/713 |
| 8,090,732 B2 * | 1/2012 | Mok | ................. | G06F 17/30678 707/713 |
| 8,195,656 B2 * | 6/2012 | Grasset | ............. | G06F 17/30867 707/732 |
| 8,799,276 B1 * | 8/2014 | Hyatt | ................ | G06F 17/30867 707/723 |
| 8,843,468 B2 * | 9/2014 | Ni | ...................... | G06F 17/30657 707/708 |
| 2005/0131758 A1 * | 6/2005 | Desikan | ............. | G06Q 30/0207 705/14.55 |
| 2006/0218225 A1 * | 9/2006 | Hee Voon | .............. | G06Q 30/02 709/201 |
| 2008/0059455 A1 * | 3/2008 | Canoy et al. | ..................... | 707/5 |
| 2008/0059508 A1 * | 3/2008 | Lu | ...................... | G06F 17/30707 |
| 2008/0281817 A1 * | 11/2008 | White | ............... | G06F 17/30867 |
| 2009/0094520 A1 * | 4/2009 | Kulas | ............... | G06F 17/30056 715/723 |
| 2009/0119261 A1 * | 5/2009 | Ismalon | .......................... | 707/3 |
| 2009/0271374 A1 * | 10/2009 | Korn | ................. | G06F 17/30867 |
| 2009/0307205 A1 * | 12/2009 | Churchill et al. | ................. | 707/5 |
| 2010/0010913 A1 * | 1/2010 | Pinckney | ............. | G06N 99/005 705/26.1 |
| 2010/0235354 A1 * | 9/2010 | Gargaro | ............ | G06F 17/30867 707/725 |
| 2011/0035402 A1 * | 2/2011 | Agrawal | ........... | G06F 17/30876 707/769 |

(Continued)

*Primary Examiner* — Polina G Peach
(74) *Attorney, Agent, or Firm* — Fish & Richardson P.C.

(57) ABSTRACT

A method including obtaining search results for a search query, determining a type of the search query, calculating a degree of focus score for the search query when the type of the search query is a non-navigation type, determining one or more social annotations to provide for display along with the search results based on the degree of focus score, and providing the one or more social annotations for display with the search results.

15 Claims, 6 Drawing Sheets

(56) References Cited

U.S. PATENT DOCUMENTS

| | | | |
|---|---|---|---|
| 2011/0252011 A1* | 10/2011 | Morris | H04L 12/185 707/706 |
| 2011/0264648 A1* | 10/2011 | Gulik et al. | 707/722 |
| 2011/0282891 A1* | 11/2011 | Kraft | G06Q 10/10 707/765 |
| 2011/0320470 A1* | 12/2011 | Williams | G06F 17/3064 707/767 |
| 2012/0016875 A1* | 1/2012 | Jin | G06F 17/30867 707/734 |
| 2012/0078870 A1* | 3/2012 | Bazaz | G06F 17/30247 707/706 |
| 2012/0131032 A1* | 5/2012 | Rakshit | G06F 17/30867 707/767 |
| 2013/0031106 A1* | 1/2013 | Schechter | G06F 17/3064 707/749 |
| 2013/0036114 A1* | 2/2013 | Wong | G06F 17/30861 707/732 |
| 2013/0054631 A1* | 2/2013 | Govani | G06F 17/30867 707/767 |
| 2013/0097140 A1* | 4/2013 | Scheel | G06Q 50/01 707/706 |
| 2013/0097144 A1* | 4/2013 | Siamwalla | G06F 17/30699 707/706 |
| 2013/0282683 A1* | 10/2013 | Kohavi et al. | 707/706 |
| 2015/0254357 A1* | 9/2015 | Thota | G06F 17/3087 707/706 |
| 2016/0012050 A1* | 1/2016 | Bursey | H04L 67/306 707/732 |

* cited by examiner

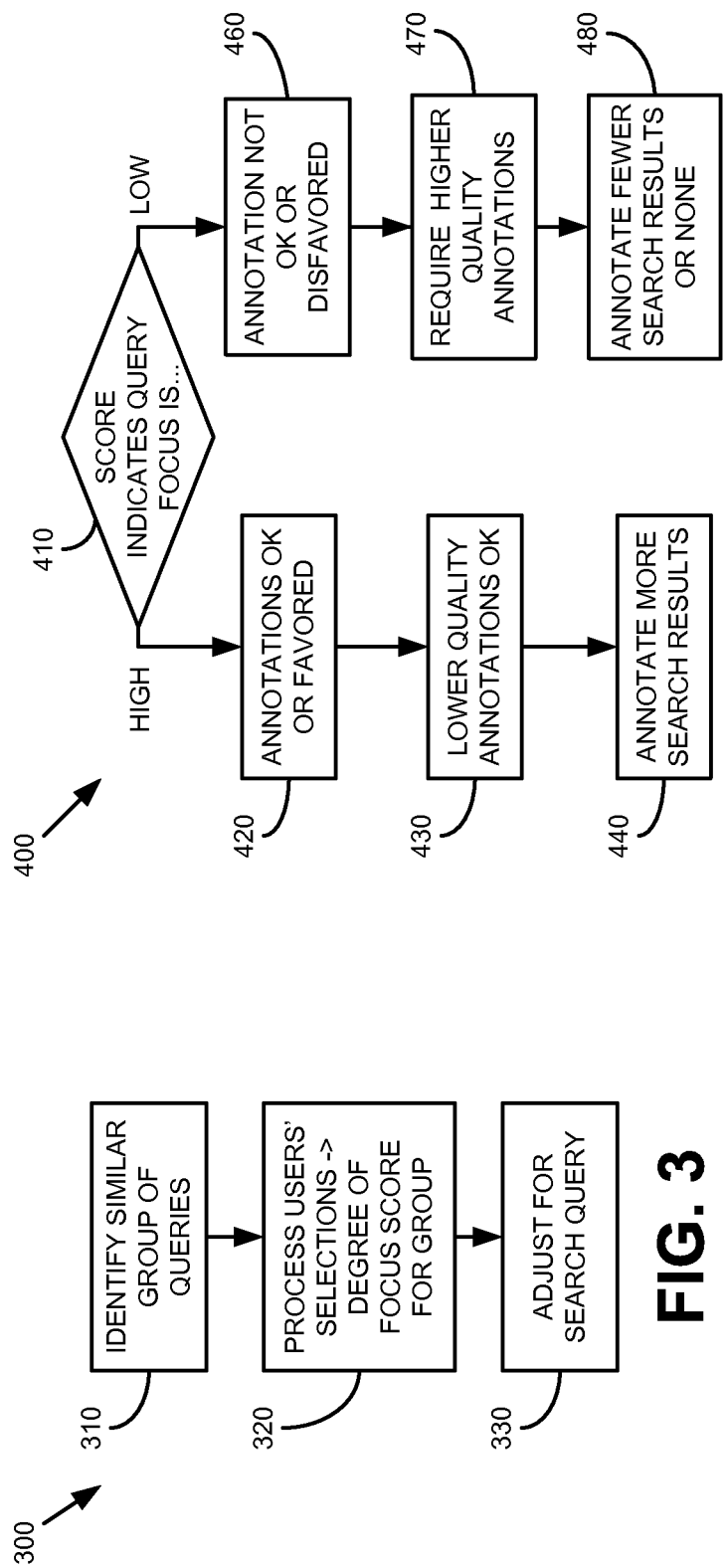

APPLYING SOCIAL ANNOTATIONS TO SEARCH RESULTS

CROSS-REFERENCE TO RELATED APPLICATION

This application claims the benefit of U.S. Provisional Application No. 61/655,443, filed Jun. 4, 2012, entitled "APPLYING SOCIAL ANNOTATIONS TO SEARCH RESULTS," the disclosure of which is hereby incorporated by reference in its entirety including attachments for all purposes.

BACKGROUND

The present disclosure generally relates to applying social annotations to search results.

When a user receives search results in response to a search request sent to a search engine or the like, the user sometimes receives additional information along with the search results. The quality of the user's experience can be affected by both the quality of the search results and the quality of the additional information.

SUMMARY

In one innovative aspect, the disclosed subject matter can be embodied in a method including obtaining search results for a search query, determining a type of the search query, calculating a degree of focus score for the search query when the type of the search query is a non-navigation type, determining one or more social annotations to provide for display along with the search results based on the degree of focus score, and providing the one or more social annotations for display with the search results.

In another innovative aspect, the disclosed subject matter can be embodied in a system including one or more processors and a machine-readable medium including instructions stored therein. When executed by the one or more processors, the instructions cause the processors to perform operations including obtaining search results for a search query, determining a type of the search query, calculating a degree of focus score for the search query at least when the type of the search query is a non-navigation type, determining one or more social annotations to provide for display along with the search results based on the degree of focus score, and providing the one or more social annotations for display with the search results.

In a further innovative aspect, the disclosed subject matter can be embodied in a machine-readable medium including instructions stored therein. When executed by a machine, the instructions cause the machine to perform operations including obtaining search results for a search query, determining a type of the search query, calculating a degree of focus score for the search query only when the type of the search query is a non-navigation type, determining one or more social annotations to provide for display along with the search results based on the degree of focus score, and providing the one or more social annotations for display with the search results.

In additional innovative aspects, calculating the degree of focus score for the search query further includes identifying a group of queries similar or identical to the search query; processing other users' selections of search results for the group of queries to determine the degree of focus score, and adjusting the degree of focus score for the search query based on a degree of similarity between the search query and the group of queries.

In more innovative aspects, the step of determining the one or more social annotations to provide for display determines to display at least one of the social annotations with the search results only in a case that the degree of focus score is greater than a threshold, favors displaying the at least one of the social annotations along with the search results in a case that the degree of focus score is more than a threshold, favors displaying the at least one of the social annotations by lowering an annotation quality required to qualify for display, disfavors displaying any of the social annotations along with the search results in a case that the degree of focus score is less than a threshold, or disfavors displaying any of the social annotations by raising an annotation quality required to qualify for display.

Possible advantages of the subject technology include adding social annotations to search results in a manner more likely to be valuable to a user. Likewise, social annotations may be less likely to be added when not as valuable to a user. As one possible result, users may pay more attention to the social annotations when those annotations are present. As another possible result, valuable real estate on a search results page may be less likely consumed by annotations that might provide limited benefit to a user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIG. 3 is a flowchart of an example method for calculating a degree of focus score for a search query according to some aspects of the disclosure.

FIG. 4 is a flowchart of an example method for determining at least one of how many or which annotations to display along with which search results based on a degree of focus score according to aspects of the disclosure.

DETAILED DESCRIPTION

Figure 1:
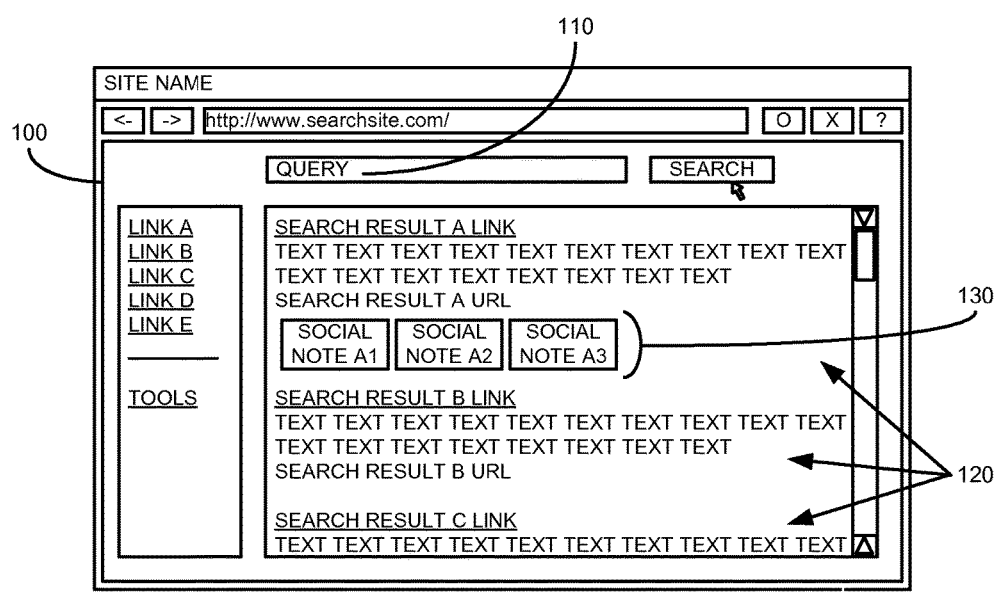
FIG. 1 illustrates an example search page with search results and social annotations according to some aspects of the disclosure.

The detailed description set forth below is intended as a description of various configurations of the subject technology and is not intended to represent the only configurations in which the subject technology may be practiced. The appended drawings are incorporated herein and constitute a part of the detailed description. The subject technology is not limited to the specific details set forth herein and may be practiced without these specific details.

Although certain examples provided herein describe a user's information (e.g., search queries and selections of results of search queries) being stored in memory, in some examples, the user may delete the user information from memory and/or opt out of having the user information stored in memory. In example aspects, the user may adjust appropriate settings to selectively limit the types of user information stored in memory, or select the memory in which the user information is stored (e.g., locally on the user's device as opposed to remotely a server). In example aspects, the user information may not include and/or share the specific identification of the user (e.g., the user's name) unless otherwise specifically provided or directed by the user.

Social annotations (e.g. "Mr. Person +1'd this", "Ms. Person likes this") are increasingly appended to web search results to help users find relevant information and increase user engagement overall. The quality of these annotations is important. If search engines produce low quality annotations frequently, then users will learn to not notice them, causing the value of the high quality annotations to be diminished. In addition, social annotations take up valuable real estate on a search results page and can cause unappealing clutter.

The subject technology concerns determining how suitable annotations are in general for a specific query. The appropriateness of adding annotations to search results for a query depends on two attributes:
1. The suitability of the particular search query to annotations. For example, a user who issues a navigation type query e.g., a query for a specific web site) has a very specific concrete purpose for the query, and social annotations are unlikely to enhance their experience.
2. The quality of the names associated with social annotations, that is, how close the people associated with the annotations are to a user, how relevant the people are to the search result, etc. (As described herein, an annotation associated with a higher quality name is referred to as a "higher quality annotation," and an annotation associated with a lower quality name is referred to as a "lower quality annotation.")

One aspect of the subject technology processes search queries to determine if they are navigation or non-navigation queries. As discussed herein, navigation type queries include queries searching for a particular website or service. For example, instead of entering an entire uniform resource locator (URL) for a website (e.g., www.website_name.com), users may simply enter a portion of the URL into a search engine (e.g., website_name). Such a query can be determined to be a navigation type query. Social annotations to results of navigation queries c less likely to be useful to users.

Another aspect of the subject technology processes patterns of users' selections of (e.g., clicks on) search results for a query and a group of similar queries. The processing can take the form of generating a degree of focus score for a received query. In some aspects, the scoring process includes three steps. The first step is identifying a group of queries sufficiently similar or identical to the received query that processing of users' selections of the search results for those queries has statistical significance. The second step is processing those users' selections to determine a score measuring a degree of focus for the group of queries. The top few search results for a more focused group of queries tend to be repeatedly selected by different users. Statistical processing of the users' selections can generate a higher degree of focus score for such queries. The third step is adjusting the degree of focus score for the search query, for example based on a degree of similarity between the search query and the group of similar queries.

If a received query is scored as being more focused, a limited number of social annotations added to the top search results for the query can be useful to a user without adding too much clutter to a search website. Thus, addition of social annotations to more focused queries can be favored because annotations added to those queries can be more likely to provide value to a user. Conversely, addition of social annotations to less focused queries can be disfavored. Favoring or disfavoring can be performed by adjusting a required quality of an annotation based on a query's degree of focus score. For example, lower quality annotations can be added to search results for a more focused query because those annotations may still be useful due to the nature of the query. Likewise, only higher quality annotations can be added to search results for a less focused query because those annotations may be useful due to their higher quality. Alternatively, if no higher quality annotations are available, no annotations can be added to the search results.

FIG. 1 illustrates an example search page with search results and social annotations according to some aspects of the disclosure. Search page 100 is displayed by a web browser or other application that is accessing a search site. Query 110 has been entered into the search page, which has displayed search results 120. Social annotations 130 are displayed along with one of the search results. Examples of social annotations include but are not limited to indications that another user liked or disliked the search results (e.g. "Mr. Person +1'd this" or "Ms. Person likes this") comments, postings, and pictures provided by other users, and other information provided by one or more users. Based on various aspects of the subject technology, fewer or more social annotations can be displayed with one of the search results or more than one of the search results, or no social annotations can be displayed with any of the search results.

Figure 2:
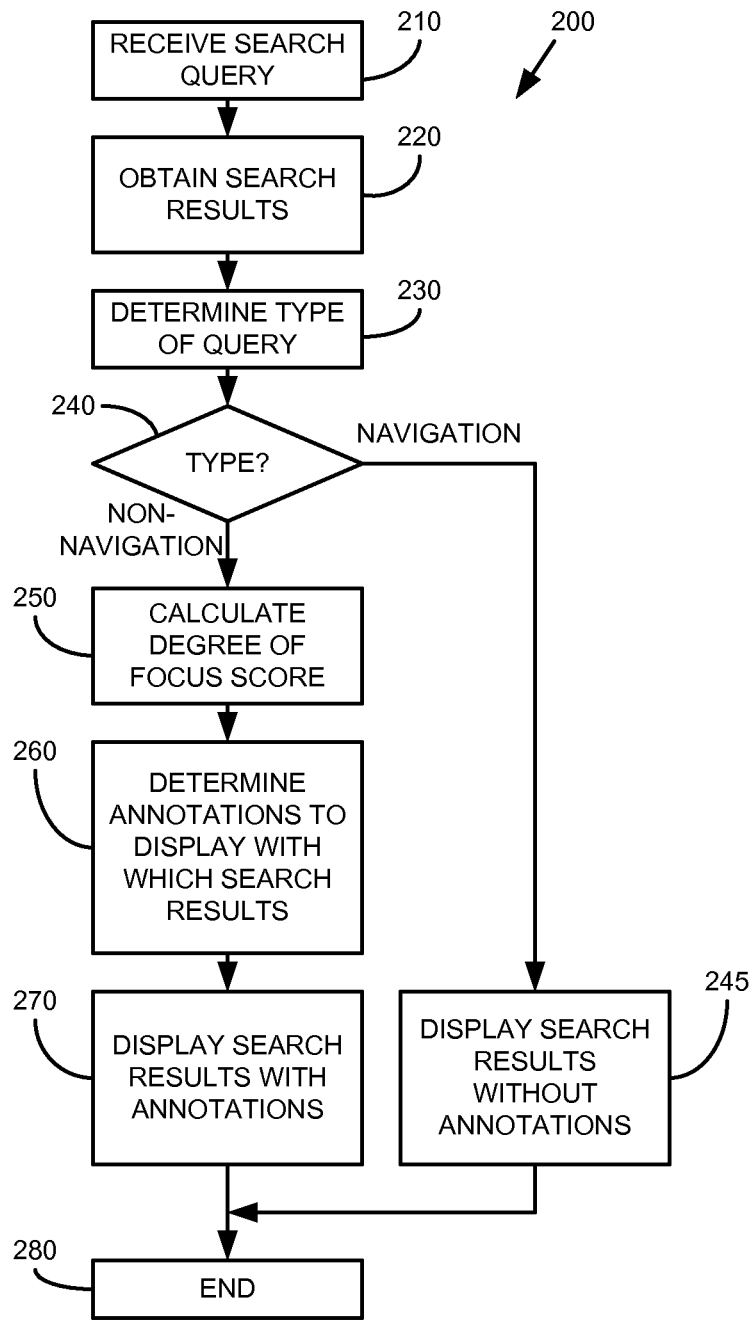
FIG. 2 is a flowchart of an example method for applying social annotations to search results for a search query according to some aspects of the disclosure.

FIG. 2 is a flowchart of example method 200 for applying social annotations to search results for a search query according to some aspects of the disclosure. The method can be performed by a server or other computing device that hosts a search engine. A search query is received in step 210, for example from a web browser or other application running on a client or other computing device. Search results for the search query are obtained in step 220.

A type of the search query is determined in step 230. Possible types include navigation type or non-navigation type. Navigation type queries are queries searching for a particular website or service. For example, instead of entering an entire uniform resource locator (URL) for a website (e.g., www.website_name.com) into a browser, users often simply enter a portion of the URL into a search engine (e.g., website_name). Such a query is a navigation type query. Other queries are non-navigation type queries. If the search query is determined to be a navigation type, flow proceeds from decision step 240 to step 245, where the search results are displayed without any social annotations according to aspects of this disclosure. Otherwise, flow proceeds from step 240 to step 250.

A degree of focus score is calculated for the search query in step 250. One approach for calculating the degree of focus score is illustrated in FIG. 3, which is a flowchart of example method 300 for calculating a degree of focus score for a search query according to some aspects of the disclosure.

A group of queries similar or identical to the search query is determined in step 310. This determination can be made using various statistical techniques applied to a database of previous search queries by users. The statistical techniques can be applied based on keywords in the queries or using natural language processing. The group of similar queries can be determined in other ways as well.

Users' selections of search results for the group of queries are processed in step 320 to calculate a degree of focus score for the group of queries. Again, various statistical techniques can be used to calculate this score, for example techniques measuring statistical dispersion of the users' selections. Examples of these techniques include but are not limited to calculating standard deviations, absolute deviations, interquartile or interdecile ranges, other types of ranges, means, and meridians.

The score for the group of queries are adjusted for the search query in step 330. For example, the score can be multiplied by a factor representing a similarity of the search query to queries in the group of queries. Other techniques for adjusting the score can be used, or the score for the group of queries can be used as the score for the search query.

Returning to FIG. 2, flow proceeds from step 250 to step 260. A determination is made in step 260 about social annotations to display along with which of the search results for the search query. This determination can be made based on the type of the search query and the degree of focus score calculated in steps 250. One technique for making this determination is illustrated in FIG. 4.

FIG. 4 is a flowchart of an example method for determining social annotations to display along with which search results based on a degree of focus score according to aspects of the disclosure.

Method 400 begins with decision step 410. If the degree of focus score for a search query is high, for example more than some predetermined statistical threshold, flow proceeds to steps 420, 430, and 440. If the degree of focus score is low, flow proceeds to steps 460, 470, and 480.

Step 420 represents a determination that displaying social annotations with one or more search results is allowed or favored. Thus, step 430 indicates that lower quality social annotations can be displayed with one or more search results for the search query. Step 440 likewise indicates that more search results can be annotated. One possible result of steps 420 to 440 is that more social annotations may be provided to a user with search results for a more focused search query. Because of the focused nature of the search query, those social annotations are likely to be valuable to a user even if they are of lower quality.

In contrast, step 460 represents a determination that displaying social annotations with one or more search results is not allowed or at least disfavored. Thus, step 470 indicates that only higher quality social annotations should be displayed with one or more search results for the search query. Step 480 likewise indicates that fewer search results—or even no search results—should be annotated. One possible results of steps 460 to 480 is that fewer social annotations may be provided to a user with search results for a less focused search query. Because of the less focused nature of the search query, those social annotations would be likely to have less value to a user unless they are of higher quality. Another possible result of steps 460 to 480 is avoiding clutter that could be caused by displaying many social annotations, most of which may not be of any interest to a user due to the unfocused nature of the search query.

In another aspect, social annotations are only considered for display along with the top one or possibly top few search results. If display of annotations is favored, more search results can be annotated. Conversely, if display of annotations is disfavored, fewer search results can be annotated. In other aspects, different measures can be used to determine which search results to annotate.

Figure 5:
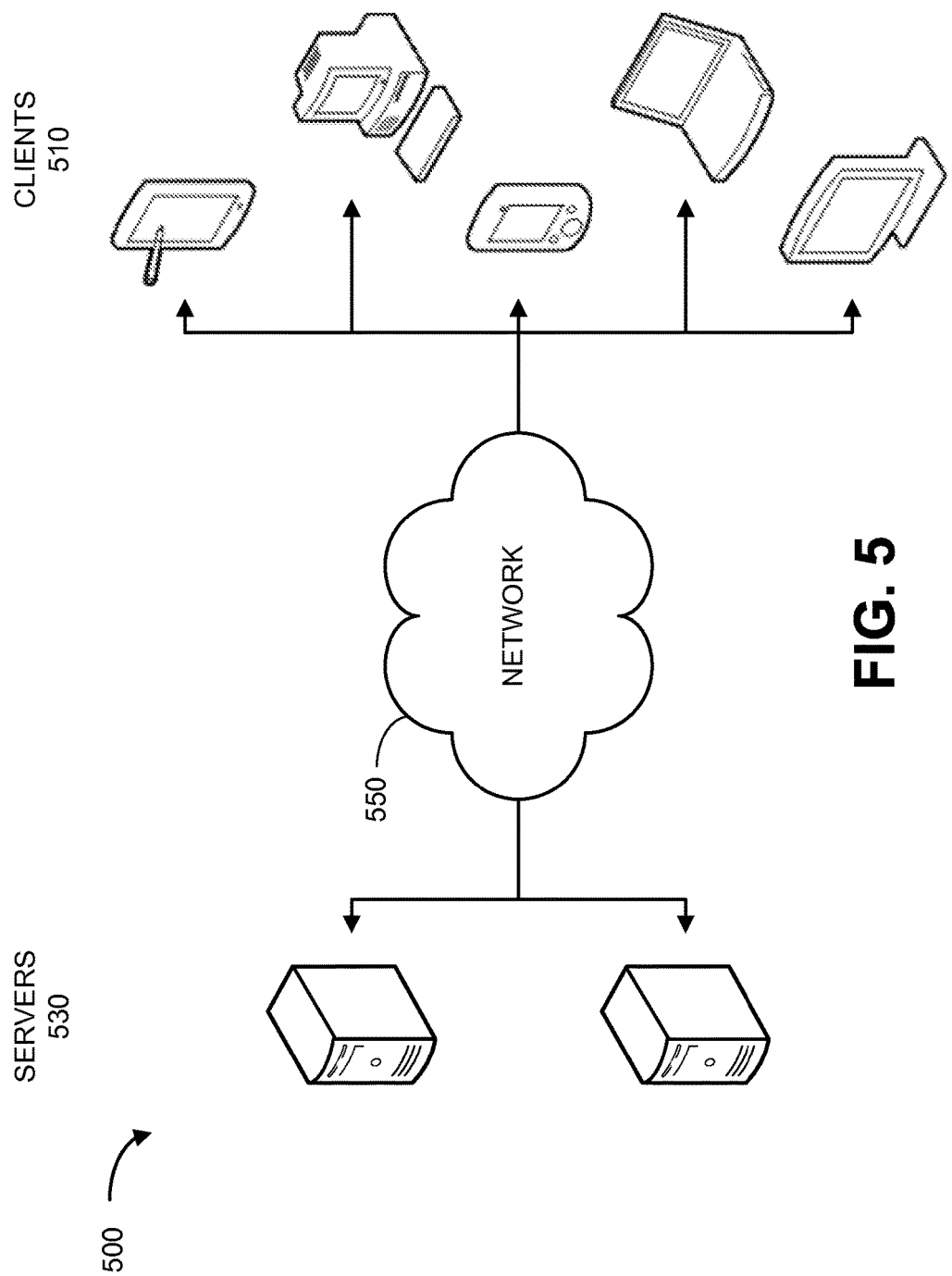
FIG. 5 illustrates an example of an architecture for applying social annotations to search results for a search query according to some aspects of the disclosure.

FIG. 5 illustrates an example of architecture 500 used to apply social annotations to search results for a search query according to certain aspects of the disclosure. The architecture 500 includes servers 530 and clients 510 connected over a network 550. One of the many servers 530 is configured to host instructions and data, including without limitation social annotations, for example stored in a data repository, and instructions for applying the social annotations to search results for a search query according to aspects of the disclosure. Alternatively, multiple servers 530 can host these data and instructions (or portions thereof) for purposes of load balancing, or one of the many clients can execute the instruction without the assistance of a server.

Clients 510 and servers 530 can be any computing devices having processing hardware, memory, and communications capability necessary to perform some or all of the operations disclosed herein. Clients 510 to which servers 530 are connected over the network 550 can be, for example, desktop computers, mobile computers, tablet computers (e.g., including e-book readers), mobile devices (e.g., a smartphones or personal digital assistants), set top boxes (e.g., for a television with one or more processors coupled thereto and/or embedded therein), video game consoles, or any other devices having memory, processing hardware, and communications capabilities for applying social annotations to search results for a search query according to certain aspects of this disclosure.

The network 550 can include, for example, any one or more of a personal area network (PAN), a local area network (LAN), a campus area network (CAN), a metropolitan area network (MAN), a wide area network (WAN), a broadband network (BBN), a peer-to-peer network, an ad-hoc network, the Internet, and the like. Further, the network can include, but is not limited to, any one or more network topologies such as a bus network, a star network, a ring network, a mesh network, a star-bus network, tree or hierarchical network, and the like.

Figure 6:
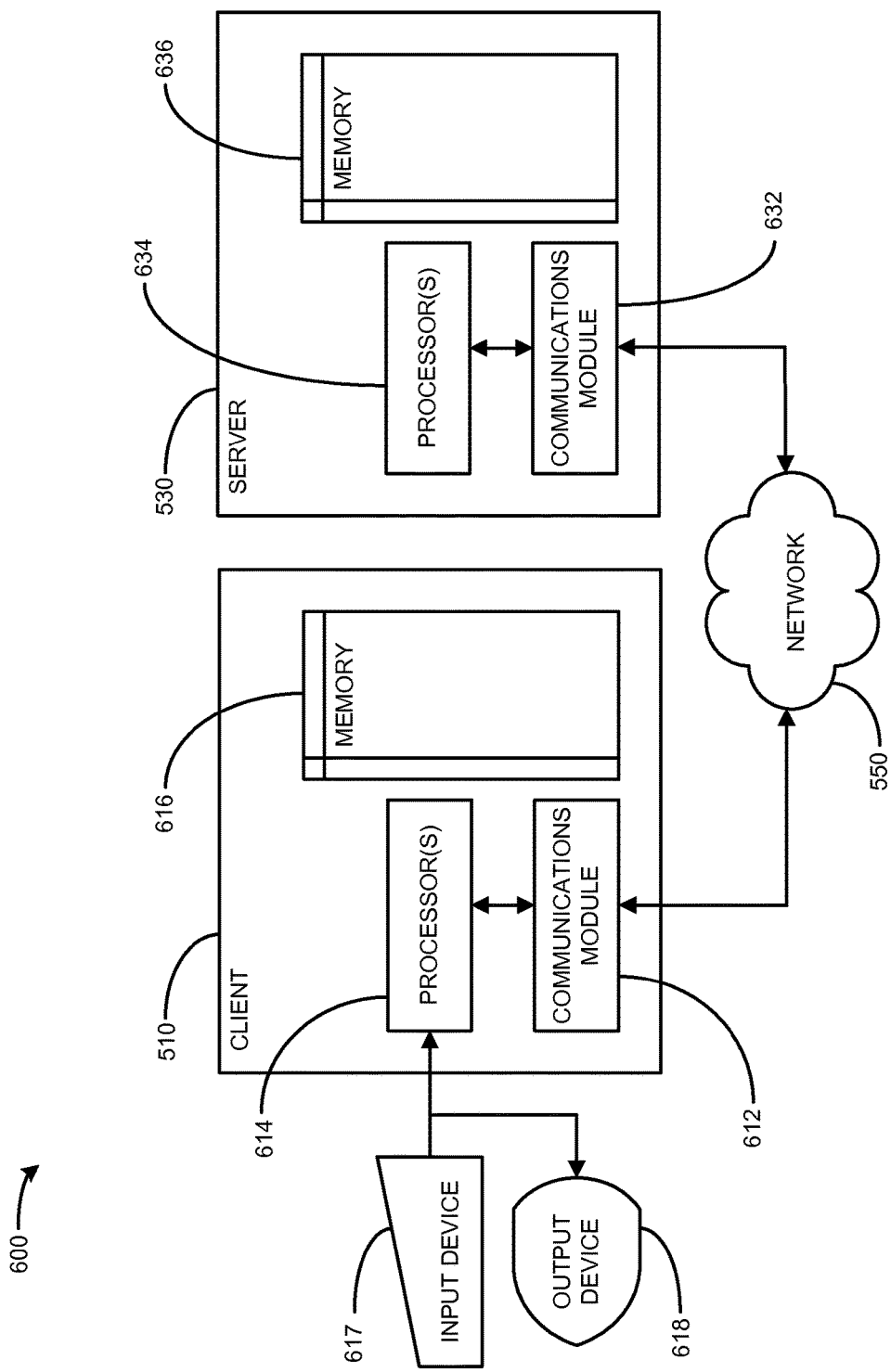
FIG. 6 is a block diagram illustrating examples of a client and a server from the architecture of FIG. 5 according to certain aspects of the disclosure.

FIG. 6 is a block diagram 600 illustrating examples of client 510 and server 530 in architecture 500 of FIG. 5 according to certain aspects of the disclosure. Client 510 and server 530 are connected over the network 550 via respective communications modules 612 and 632. Communications modules 612 and 632 are configured to interface with network 550 to send and receive information, such as data, requests, responses, and commands, to other devices on the network. Communications modules 612 and 632 can be, for example, modems or Ethernet cards.

Both client 510 and server 530 can include processing hardware and some form of memory. In FIG. 6, client 510 includes processor 614 and memory 616, and server 530 includes processor 634 and memory 636. Memory 616 and 636 can be volatile or non-volatile memory. Client 510 also can include input device 617 and output device 618 for accepting input from and providing output to a user. Server 530 also can include such input and output devices.

Figure 7:
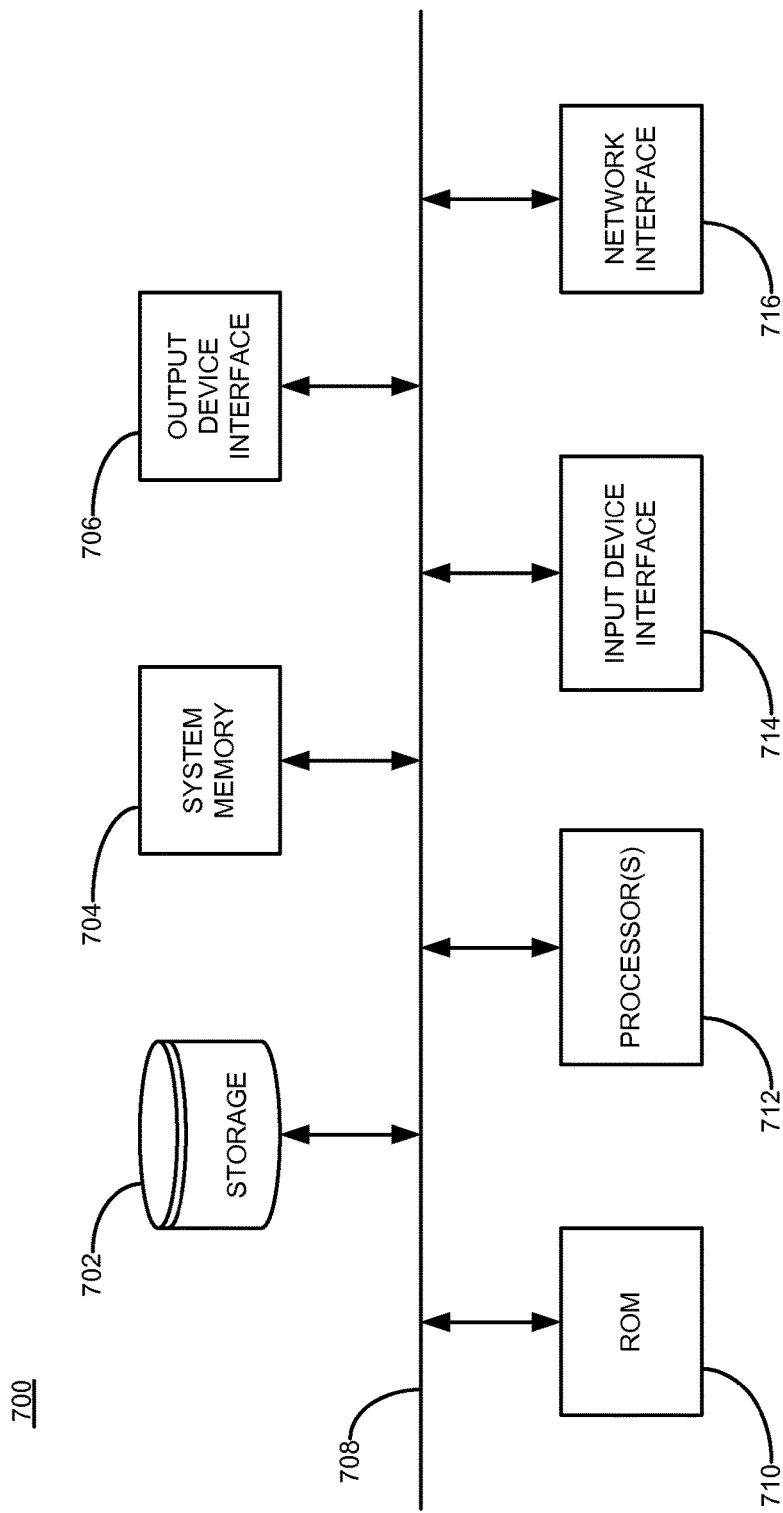
FIG. 7 conceptually illustrates an example of an electronic system with which some aspects of the subject technology can be implemented.

FIG. 7 conceptually illustrates an example of an electronic system with which some aspects of the subject technology can be implemented. Electronic system 700 can be a computer, phone, PDA, or any other sort of electronic device, including but not limited to client 510 and server 530. Electronic system 700 can also be embedded in another device, for example, and without limitation, a mobile telephone, a personal digital assistant (PDA), a mobile audio player, a Global Positioning System (GPS) receiver, a video game console, a television set top box, a client such as client 510, and/or a server such as server 530.

Such an electronic system can include various types of computer readable media and interfaces for various other types of computer readable media. Electronic system 700 includes a bus 708, processing unit(s) 712, a system memory 704, a read-only memory (ROM) 710, a permanent storage device 702, an input device interface 714, an output device interface 706, and a network interface 716.

Bus 708 collectively represents all system, peripheral, and chipset buses that communicatively connect the numerous internal devices of electronic system 700. For instance, bus 708 communicatively connects processing unit(s) 712 with ROM 710, system memory 704, and permanent storage device 702.

From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of the electronic system. Permanent storage device 702, on the other hand, is a read-and-write memory device. This device is a non-volatile memory unit that stores instructions and data even when electronic system 700 is off. Some implementations of the subject disclosure use a mass-storage device (such as a magnetic or optical disk and its corresponding disk drive) as permanent storage device 702.

Other implementations use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such a random access memory. System memory 704 stores some of the instructions and data that the processor needs at runtime. In some implementations, the processes of the subject disclosure are stored in system memory 704, permanent storage device 702, and/or ROM 710. For example, the various memory units can include instructions for applying social annotations to search results for a search query according to aspects of the disclosure. From these various memory units, processing unit(s) 712 retrieves instructions to execute and data to process in order to execute the processes of some implementations.

Bus 708 also connects to input and output device interfaces 714 and 706. Input device interface 714 enables the user to communicate information and select commands to the electronic system. Input devices used with input device interface 714 include, for example, alphanumeric keyboards and pointing devices (also called "cursor control devices"). Output device interfaces 706 enables, for example, the display of images generated by the electronic system 700. Output devices used with output device interface 706 include, for example, printers and display devices, such as cathode ray tubes (CRT) or liquid crystal displays (LCD). Some implementations include devices such as a touchscreen that functions as both input and output devices.

Finally, as shown in FIG. 7, bus 708 also couples electronic system 700 to a network (not shown) through a network interface 716. In this manner, the computer can be a part of a network of computers such as network 550. Any or all components of electronic system 700 can be used in conjunction with the subject disclosure.

The operations described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., communication network 750) can include, for example, any one or more of a personal area network (PAN), a local area network (LAN), a campus area network (CAN), a metropolitan area network (MAN), a wide area network (WAN), a broadband network (BBN), the Internet, and the like. Further, the network can include, but is not limited to, any one or more network topologies such as a bus network, a star network, a ring network, a mesh network, a star-bus network, tree or hierarchical network, and the like. The communications modules can be, for example, modems or Ethernet cards.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged and that some steps may be skipped. Some of the steps may be performed simultaneously. For example, in certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as "configured" or a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

While this specification contains many specifics, these should not be construed as limitations on the scope of what may be claimed, but rather as descriptions of particular implementations of the subject matter. Certain features that are described in this specification in the context of separate aspects and examples can also be implemented in combination in a single embodiment. Conversely, various features that are described in the context of a single aspect or example can also be implemented in multiple aspects and example separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

These and other implementations are within the scope of the following claims.

What is claimed is:

1. A computer-implemented method executed by one or more processors, the method comprising:
    obtaining, by the one or more processors, web search results for a search query;
    determining, by the one or more processors, that the search query is a non-navigational search query; and
    in response to determining that the search query is a non-navigational search query:
        determining, by the one or more processors, a degree of focus score for the search query the determining comprising:
            identifying a group of similar queries that are each determined to be similar to the search query;
            identifying selections of web search results provided in response to the group of similar queries;
            determining the degree of focus score for the search query based on a statistical dispersion of the identified selections of the web search results provided in response to the group of similar queries to the search query;
        determining, by the one or more processors, the degree of focus score is above a threshold and setting the degree of focus score to high, or the degree of focus is below the threshold and setting the degree of focus score to low, wherein the threshold is a measure of the statistical dispersion of identified selections of the web search results provided in response to the group of similar queries to the search query;

selecting, by the one or more processors, a set of social annotations to provide for display along with the web search results, wherein each social annotation is appended to a particular web search result for display with the particular web search result, the set of social annotations comprising one or more social annotations that are selected based on the degree of focus score and respective qualities of the one or more social annotations, each of the one or more social annotations having an annotation quality, each annotation quality exceeding an annotation quality threshold required to qualify for being in the set of social annotations, the annotation quality threshold and number of social annotations in the set of social annotations being determined based on the degree of focus score, wherein in response to determining the degree of focus score is high: the annotation quality threshold being lowered and the number of the social annotations being raised; and providing, by the one or more processors, the selected social annotations for appending to the web search results for display on a client device, at least one web search result being annotated with at least one social annotation in the set of social annotations.

2. The method of claim 1, wherein determining the one or more social annotations to provide for display comprises:
determining that the degree of focus score meets or exceeds a threshold; and
in response to determining that the degree of focus score meets or exceeds the threshold, determining to display at least one of the social annotations with the search results.

3. The method of claim 1, wherein determining the one or more social annotations to provide for display comprises:
determining that the degree of focus score meets or exceeds a threshold; and
in response to determining that the degree of focus score meets or exceeds the threshold, favoring the display of the at least one of the social annotations along with the search results.

4. The method of claim 1, wherein determining the one or more social annotations to provide for display comprises:
determining that the degree of focus score does not exceed a threshold; and
in response to determining that the degree of focus score does not exceed the threshold, disfavoring the display any of the social annotations along with the search results.

5. The method of claim 4, wherein disfavoring the display of any of the social annotations comprises raising the annotation quality threshold.

6. A system comprising:
one or more processors; and a data store coupled to the one or more processors having instructions stored thereon which, when executed by the one or more processors, causes the one or more processors to perform operations comprising:
obtaining web search results for a search query;
determining that the search query is a non-navigational search query; and
in response to determining that the search query is a non-navigational search query:
determining a degree of focus score for the search query the determining comprising;
identifying a group of similar queries that are each determined to be similar to the search query;
identifying selections of web search results provided in response to the group of similar queries;
determining the degree of focus score for the search query based on a statistical dispersion of the identified selections of the web search results provided in response to the group of similar queries to the search query;
determining the degree of focus score is above a threshold and setting the degree of focus score to high, or the degree of focus score is below the threshold and setting the degree of focus score to low, wherein the threshold is a measure of the statistical dispersion of identified selections of the web search results provided in response to the group of similar queries to the search query;
selecting a set of social annotations to provide for display along with the web search results, wherein each social annotation is appended to a particular web search result for display with the particular web search result, the set of social annotations comprising one or more social annotations that are selected based on the degree of focus score and respective qualities of the one or more social annotations, each of the one or more social annotations having an annotation quality, each annotation quality exceeding an annotation quality threshold required to qualify for being in the set of social annotations, the annotation quality threshold and number of social annotations in the set of social annotations being determined based on the degree of focus score, wherein in response to determining the degree of focus score is high: the annotation quality threshold being lowered and the number of the social annotations being raised; and
providing the selected social annotations for appending to the web search results for display on a client device, at least one web search result being annotated with at least one social annotation in the set of social annotations.

7. The system of claim 6, wherein determining the one or more social annotations to provide for display comprises:
determining that the degree of focus score meets or exceeds a threshold; and
in response to determining that the degree of focus score meets or exceeds the threshold, determining to display at least one of the social annotations with the search results.

8. The system of claim 6, wherein determining the one or more social annotations to provide for display comprises:
determining that the degree of focus score meets or exceeds a threshold; and
in response to determining that the degree of focus score meets or exceeds the threshold, favoring the display of the at least one of the social annotations along with the search results.

9. The system of claim 6, wherein determining the one or more social annotations to provide for display comprises:
determining that the degree of focus score does not exceed a threshold; and
in response to determining that the degree of focus score does not exceed the threshold, disfavoring the display any of the social annotations along with the search results.

10. The system of claim 9, wherein disfavoring the display of any of the social annotations comprises raising the annotation quality threshold.

11. A non-transitory computer-readable medium storing instructions that, when executed by one or more processors, cause the one or more processors to perform operations comprising:
  obtaining, by the one or more processors, web search results for a search query;
  determining, by the one or more processors, whether the search query is a non-navigational search query; and
  in response to determining that the search query is a non-navigational search query:
    determining, by the one or more processors, a degree of focus score for the search query the determining comprising:
      identifying a group of similar queries that are each determined to be similar to the search query;
      identifying selections of web search results provided in response to the group of similar queries;
      determining the degree of focus score for the search query based on a statistical dispersion of the identified selections of the web search results provided in response to the group of similar queries to the search query;
    determining, by the one or more processors, the degree of focus score is above a threshold and setting the degree of focus score to high, or the degree of focus is below the threshold and setting the degree of focus score to low, wherein the threshold is a measure of the statistical dispersion of identified selections of the web search results provided in response to the group of similar queries to the search query;
    selecting, by the one or more processors, a set of social annotations to provide for display along with the web search results, wherein each social annotation is appended to a particular web search result for display with the particular web search result, the set of social annotations comprising one or more social annotations that are selected based on the degree of focus score and respective qualities of the one or more social annotations, each of the one or more social annotations having an annotation quality, each annotation quality exceeding an annotation quality threshold required to qualify for being in the set of social annotations, the annotation quality threshold and number of social annotations in the set of social annotations being determined based on the degree of focus score, wherein in response to determining the degree of focus score is high: the annotation quality threshold being lowered and the number of the social annotations being raised; and
    providing, by the one or more processors, the selected social annotations for appending to the web search results for display on a client device, at least one web search result being annotated with at least one social annotation in the set of social annotations.

12. The medium of claim 11, wherein determining the one or more social annotations to provide for display comprises:
  determining that the degree of focus score meets or exceeds a threshold; and
  in response to determining that the degree of focus score meets or exceeds the threshold, determining to display at least one of the social annotations with the search results.

13. The medium of claim 11, wherein determining the one or more social annotations to provide for display comprises:
  determining that the degree of focus score meets or exceeds a threshold; and
  in response to determining that the degree of focus score meets or exceeds the threshold, favoring the display of the at least one of the social annotations along with the search results.

14. The medium of claim 11, wherein determining the one or more social annotations to provide for display comprises:
  determining that the degree of focus score does not exceed a threshold; and
  in response to determining that the degree of focus score does not exceed the threshold, disfavoring the display any of the social annotations along with the search results.

15. The medium of claim 14, wherein disfavoring the display of any of the social annotations comprises raising the annotation quality threshold.

* * * * *